(12) United States Patent
Hayashi et al.

(10) Patent No.: US 7,098,554 B2
(45) Date of Patent: Aug. 29, 2006

(54) STEERING SHAFT LOCKING DEVICE

(75) Inventors: Masaki Hayashi, Aichi (JP); Toshihiro Nagae, Aichi (JP); Tomoyuki Funayama, Toyota (JP); Tomoo Kakegawa, Aichi-ken (JP); Takashi Yanatsubo, Toyota (JP)

(73) Assignees: Kabushiki Kaisha Tokai Rika Denki Seisakusho, Aichi (JP); Toyota Jidosha Kabushiki Kaisha, Toyota (JP)

( * ) Notice: Subject to any disclaimer, the term of this patent is extended or adjusted under 35 U.S.C. 154(b) by 78 days.

(21) Appl. No.: 10/902,338

(22) Filed: Jul. 29, 2004

(65) Prior Publication Data

US 2005/0023900 A1    Feb. 3, 2005

(30) Foreign Application Priority Data

Jul. 31, 2003   (JP) ............................. 2003-204687

(51) Int. Cl.
  *B60R 25/00*   (2006.01)
  *H01H 47/22*   (2006.01)
  *B60L 1/00*    (2006.01)
  *B60L 3/00*    (2006.01)
  *H02G 3/00*    (2006.01)
  *H02P 1/00*    (2006.01)
  *H02P 3/00*    (2006.01)

(52) U.S. Cl. ..................... 307/10.2; 307/9.1; 307/10.1; 307/10.3; 70/245; 318/256; 318/739

(58) Field of Classification Search ............... 307/10.2, 307/10.3, 9.1, 10.1; 180/287; 318/739, 318/180, 256; 70/245

See application file for complete search history.

(56) References Cited

U.S. PATENT DOCUMENTS

| 5,488,275 A | * | 1/1996 | Tice ............................ 318/468 |
| 6,118,243 A | * | 9/2000 | Reed et al. .................. 318/468 |
| 6,806,664 B1 | * | 10/2004 | Beishline ..................... 318/280 |

FOREIGN PATENT DOCUMENTS

| JP | 6-49672 U    | 7/1994 |
| JP | 2000-95066 A | 4/2000 |
| JP | 2003-63354 A | 3/2003 |

* cited by examiner

Primary Examiner—Phuong T. Vu
Assistant Examiner—Adi Amrany
(74) Attorney, Agent, or Firm—Crompton, Seager & Tufte, LLC

(57) ABSTRACT

A steering shaft locking device capable of performing a locking operation in an optimum manner. The steering shaft locking device includes a motor to which voltage is applied to generate a drive force. A locking bar is moved by the drive force of an actuator so as to engage the steering shaft. A steering shaft lock ECU connected to the motor performs a first control to move the locking bar to a lock position, at which the locking bar engages the steering shaft, and a second control to move the locking bar to an unlock position, at which the locking bar is disengaged from the steering shaft. A voltage control means controls the voltage applied to the motor during the first control such that the voltage is less than or equal to the voltage applied to the motor during the second control.

12 Claims, 2 Drawing Sheets

STEERING SHAFT LOCKING DEVICE

BACKGROUND OF THE INVENTION

The present invention relates to a steering shaft locking device for disabling steering by engaging a locking bar with the steering shaft.

In recent years, electronic steering shaft locking devices for automobiles have been proposed. An electronic steering shaft locking device disables steering by engaging a locking bar with a steering shaft using the drive force of an actuator, such as a motor or the like. Japanese Laid-Open Patent Publication Nos. 2003-063354 and 2000-095066 describe examples of such steering shaft locking devices.

An example of this type of steering shaft locking device is shown in FIG. 1. An electronic steering shaft locking device 100 disables steering by engaging a locking bar 130 with a steering shaft 120 using the rotation drive force of a motor 110.

In an automobile provided with this type of steering shaft locking device 100, the locking bar 130 is engaged with the steering shaft 120 to lock the steering shaft 120 (locked state) before the engine starts. In the locked state, steering is disabled. For example, when a driver performs an operation to start the engine, a steering shaft lock ECU 140 drives the motor 110 (for example, forward rotation). Then, the locking bar 130 separates from the steering shaft 120 such that the steering shaft 120 is unlocked (unlocked state). In the unlocked state, steering is enabled. When the locking bar 130 is moved from a lock position to an unlock position, an unlocked state sensor switch 150 is activated. The steering shaft lock ECU 140 recognizes that the steering shaft 120 is unlocked based on the ON state of the unlocked state sensor switch 150 and stops the forward rotation of the motor 110. Unlocking of the steering shaft 120 is one condition required for starting the engine.

The steering shaft 120 is unlocked immediately after the engine stops. For example, when the driver opens the door to exit the vehicle and then closes the door, the steering shaft lock ECU 140 drives the motor 110 (for example, reverse rotation). Thus, the locking bar 130 engages the steering shaft 120 and locks the steering shaft 120. When the locking bar 130 is moved from the unlock position to the lock position, a locked state sensor switch 160 is activated. The steering shaft lock ECU 140 recognizes that the steering shaft 120 is locked based on the ON state of the locked state sensor switch 160 and stops the reverse rotation of the motor 110.

From the perspective of locking an object, automobiles are provided with door locking devices similar to steering shaft locking devices. For example, Japanese Laid-Open Utility Model Publication No. 06-049672 discloses a door locking device which reduces the noise that is generated when actuated.

As mentioned above, the steering shaft locking device 100 moves the locking bar 130 when switching from a locked state to an unlocked state (unlocking operation) or when switching from an unlocked state to a locked state (locking operation). During the unlocking operation, the locking bar 130 that is engaged with the steering shaft 120 must be pulled out of the steering shaft 120 by the steering shaft locking device 100. During the locking operation, however, the steering shaft locking device 100 may move the locking bar 130 into the steering shaft 120 with a relatively small force. That is, a larger force is required when moving the locking bar 130 during the unlocking operation than when moving the locking bar 130 during the locking operation.

Furthermore, the unlocking of the steering shaft 120 is one of the conditions necessary for starting the engine. Therefore, it is desirable that the time required for the unlocking operation be shorter than the time required for the locking operation to reduce the time between the initiation of the engine starting operation and the completion of engine starting.

SUMMARY OF THE INVENTION

The present invention provides a steering shaft locking device capable of performing the locking operation in an optimal manner.

One aspect of the present invention is a steering shaft locking device for selectively locking a steering shaft of a vehicle. The steering shaft locking device includes an actuator for generating a drive force when voltage is applied to the actuator. A locking means is moved by the drive force of the actuator and engageable with the steering shaft. A control unit, connected to the actuator, performs a first control that moves the locking means to a lock position, at which locking means engages the steering shaft, and a second control that moves the locking means to an unlock position, at which the locking means is disengaged from the steering shaft. A voltage control means controls the voltage applied to the actuator during the first control to be less than or equal to the voltage applied to the actuator during the second control.

A further aspect of the present invention is a steering shaft locking device for selectively locking the steering shaft of a vehicle. The steering shaft locking device includes an actuator for generating a drive force when voltage is applied to the actuator. A locking means is moved by the drive force of the actuator and engageable with the steering shaft. A control unit, connected to the actuator, applies a first voltage to the actuator to move the locking means to a lock position, at which the locking means engages the steering shaft and applies a second voltage to the actuator to move the locking means to an unlock position, at which the locking means is disengaged from the steering shaft. The first voltage is less than or equal to the second voltage.

Another aspect of the present invention is a steering shaft locking device for selectively locking the steering shaft of a vehicle. The steering shaft locking device includes an actuator for generating a drive force when supplied with current. A locking means is moved by the drive force of the actuator and engageable with the steering shaft. A first current flow path supplies current to the actuator to move the locking means to a lock position at which the locking means engages the steering shaft. A second current flow path supplies current to the actuator to move the locking means to an unlock position at which the locking means is disengaged from the steering shaft. The first current flow path has a resistance value that is greater than that of the second current flow path.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electronic steering shaft locking device 1 according to a preferred embodiment of the present invention will now be described.

Figure 2:
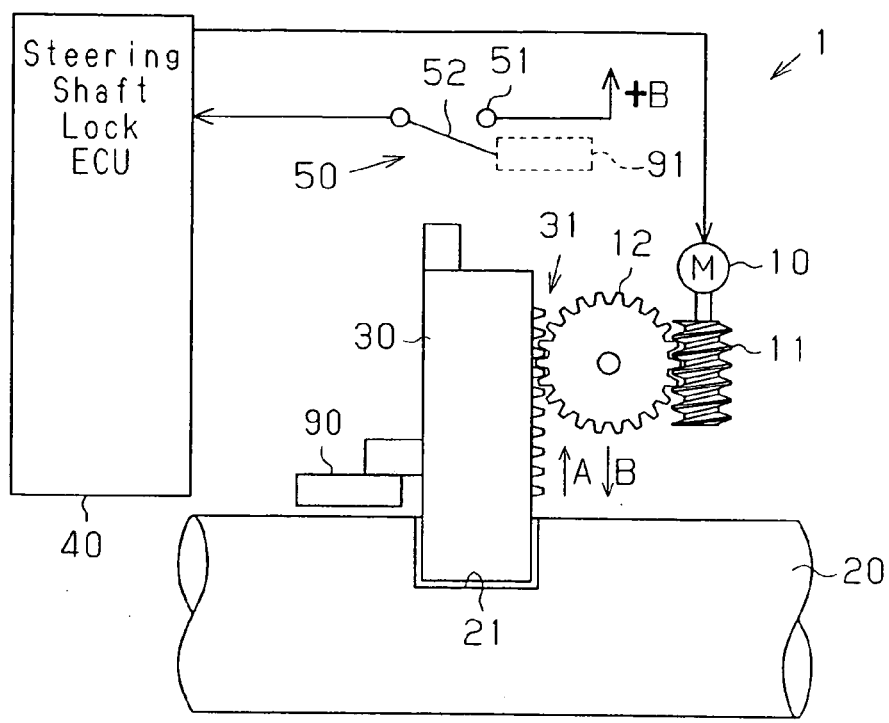
FIG. 2 is a schematic diagram showing a steering shaft locking device according to a preferred embodiment of the present invention.

As shown in FIG. 2, the electronic steering shaft locking device 1 of the preferred embodiment includes a motor 10, a worm gear 11, a pinion 12, a locking bar 30, a steering shaft lock ECU 40, and an unlocked state sensor switch 50. The steering shaft locking device 1 disables steering by engaging the locking bar 30 with the steering shaft 20 using the rotation force of the motor 10.

The motor 10 is a direct current motor capable of forward rotation drive and reverse rotation drive. The worm gear 11 is fixed to the output shaft of the motor 10. The pinion 12 engages the worm gear 11. The locking bar 30 includes a rack 31 engaged with the pinion 12. Therefore, when the motor 10 is rotated, the rotation drive force of the motor 10 is transmitted to the rack 31 of the locking bar 30 through the worm gear 11 and the pinion 12. That is, the rotational movement of the motor 10 is converted to linear movement of the locking bar 30 by means of a gear mechanism formed by the worm gear 11, the pinion 12, and the rack 31.

When the steering shaft lock ECU 40 drives the motor 10 in forward rotation from the locked state in which steering is disabled, the locking bar 30 is moved in the direction of arrow A as shown in FIG. 2 (the direction in which the locking bar 30 is separated from the steering shaft 20). As a result, the locking bar 30 is disengaged from the steering shaft 20, specifically, a concavity 21, to unlock the steering shaft 20. That is, the steering shaft locking device 1 is set in the unlocked state which enables steering. When the steering shaft lock ECU 40 drives the motor 10 in reverse rotation from the unlocked state, the locking bar 30 is moved in the direction of arrow B as shown in FIG. 2 (the direction in which the locking bar 30 approaches the steering shaft 20). As a result, the locking bar 30 engages the concavity 21 to lock the steering shaft 20. That is, the steering shaft locking device 1 is set in the locked state in which steering is disabled. In this manner, the locking bar 30 is movable between a lock position, in which the locking bar 30 is engaged with the steering shaft 20, and an unlock position, in which the locking bar 30 is disengaged from the steering shaft 20.

As described above, the steering shaft locking device 1 is provided with an unlocked state sensor switch 50. The unlocked state sensor switch 50 is a normal-open type limit switch. The unlocked state sensor switch 50 has a fixed contact 51 electrically connected to the positive terminal of the vehicle battery. The unlocked state sensor switch 50 has a movable contact 52 electrically connected to the steering shaft lock ECU 40.

When moved to the unlock position, the locking bar 30 pushes the movable contact 52 and activates (switch closed) the unlocked state sensor switch 50. That is, the unlocked state sensor switch 50 provides a signal (signal having a high (H) level) indicating that the locking bar 30 is disengaged from the steering shaft 20 (unlocked state) to the steering shaft lock ECU 40. As a result, the steering shaft lock ECU 40 recognizes that the steering shaft 20 is unlocked (unlocked state) and stops the forward rotation of the motor 10.

The unlocked state sensor switch 50 has a momentary function in which it automatically returns from the "switch closed" condition to "switch open" condition as the locking bar 30 disengages from the movable contact 52.

The steering shaft locking device 1 differs from the conventional steering shaft locking device 100 in that it is not provided with a locked state sensor switch, such as the locked state sensor switch 160. Accordingly, the steering shaft lock ECU 40 of the steering shaft locking device 1 differs from the steering shaft lock ECU 140 of the conventional steering shaft locking device 100 inasmuch as it recognizes the locking of the steering shaft 20 (locked state) by another method.

In the preferred embodiment, the locking operation control for moving from the unlocked state to the locked state by reversely rotating the motor 10 is accomplished by the steering shaft lock ECU 40. The steering shaft lock ECU 40 detects electric current flowing through the motor 10 when locking operation control is performed. When the steering shaft lock ECU 40 recognizes the locked state based on the detected electric current, the reverse rotation of the motor 10 is stopped.

Figure 3:
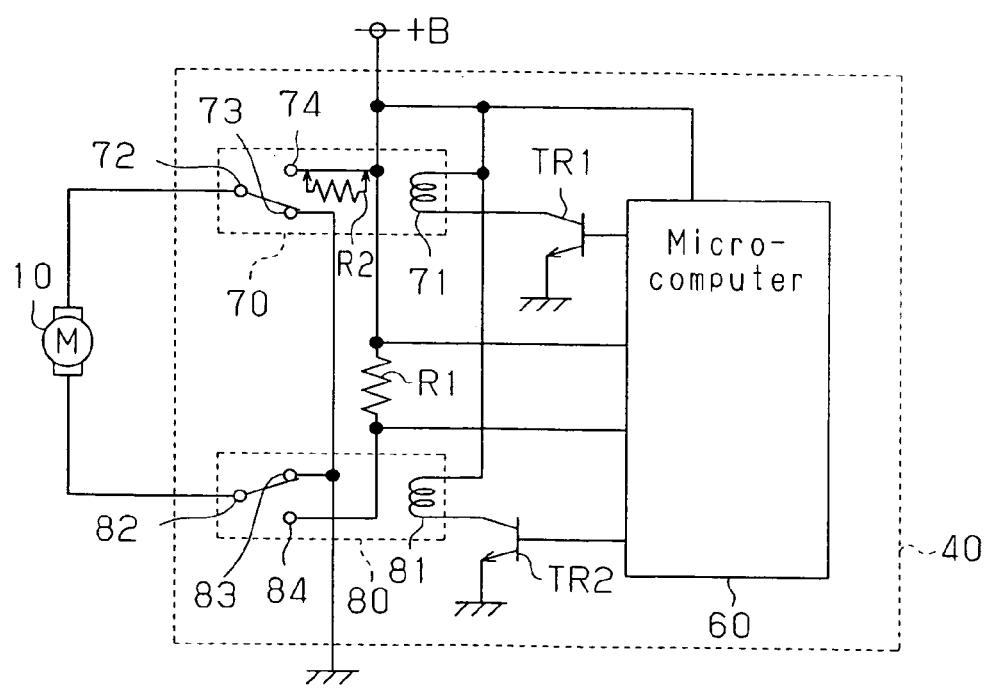
FIG. 3 is an electric circuit diagram showing the configuration of a steering shaft lock ECU included in the steering shaft locking device of FIG. 2.

The characteristic features of the steering shaft lock ECU 40 will now be described in detail with reference to FIG. 3.

The steering shaft lock ECU 40 is provided with a microcomputer 60, two transistors TR1 and TR2, two relays 70 and 80, and a resistor R1. The microcomputer 60, which includes a CPU, a ROM, a RAM, and a timer, performs various types of controls using the electric power obtained from a vehicle battery through a DC-DC converter (not shown). The relay 70 includes a movable contact 72, a negative fixed contact 73, and a positive fixed contact 74. The relay 80 includes a movable contact 82, a negative fixed contact 83, and a positive fixed contact 84.

When the steering shaft lock ECU 40 is not driving the motor 10, the microcomputer 60 provides the transistors TR1 and TR2 with a signal having a low (L) level to inactivate the transistors TR1 and TR2. In this state, coils 71 and 81 are not energized, the movable contact 72 is electrically connected to the negative fixed contact 73, and the movable contact 82 is electrically connected to the negative fixed contact 83.

The transistors TR1 and TR2 are activated when they respectively receive a high signal from the microcomputer 60. When the transistor TR1 is activated, the coil 71 is energized. In this state, the relay 70 switches the movable contact 72 from a state electrically connected to the negative fixed contact 73 to a state electrically connected to the positive fixed contact 74. When the transistor TR2 is activated, the coil 81 is energized. In this state, the relay 80 switches the movable contact 82 from a state electrically connected to the negative fixed contact 83 to a state electrically connected to the positive fixed contact 84.

The motor 10 is electrically connected between the movable contact 72 of the relay 70 and the movable contact 82 of the relay 80. The resistor R1 is electrically connected between the positive fixed contact 74 of the relay 70 and the positive fixed contact 84 of the relay 80.

During the unlocking operation control for switching from the locked state to the unlocked state, the microcomputer 60 provides the transistor TR1 with a signal having a high level while continuing to provide the transistor TR2 with a signal having a low level signal. That is, the transistor TR1 is activated, and the transistor TR2 remains inactivated. Therefore, the coil 71 of the relay 70 is energized, and the coil 81 of the relay 80 is maintained in a de-energized state. As a result, during the unlocking operation control, current flows from the positive terminal of the vehicle battery to the negative terminal of the vehicle battery through the positive fixed contact 74 and movable contact 72 of the relay 70, the motor 10, and the movable contact 82 and negative fixed contact 83 of the relay 80.

An unlocking operation current flow path is formed between the positive terminal of the vehicle battery to the negative terminal of the vehicle battery through the positive fixed contact 74 and movable contact 72 of the relay 70, the motor 10, the movable contact 82, and the negative fixed contact 83 of the relay 80.

In this way, the microcomputer 60 drives the motor 10 to rotate in the forward direction by activating only the transistor TR1 from the locked state during the unlocking operation control.

Figure 1:
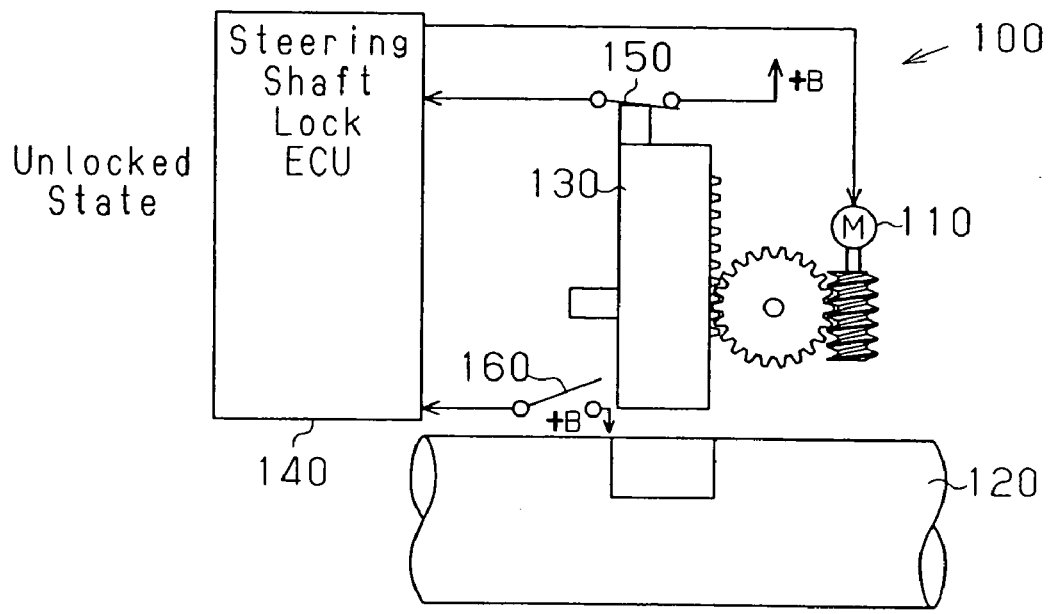
FIG. 1 is a schematic diagram showing a conventional steering shaft locking device.
Figure 1:
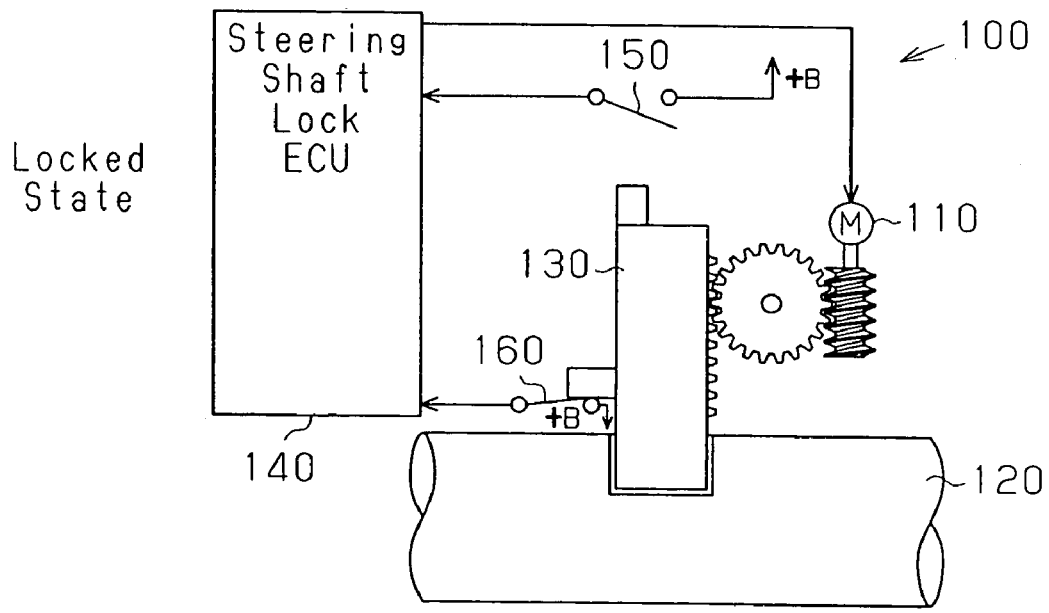

During the unlocking operation control, when the microcomputer 60 receives a signal (high level signal) indicating the unlocked state from the unlocked state sensor switch 50 (refer to FIG. 1), a low level signal is provided to the transistor TR1 and a low level signal is continuously provided to the transistor TR2. This inactivates the transistor TR1, and the transistor TR2 remains inactivated. The coil 71 of the relay 70 is de-energized, and the coil 81 of the relay 80 remains de-energized. As a result, current does not flow to the motor 10. This stops the forward rotation of the motor 10.

In this way, during the unlocking operation control, the microcomputer 60 recognizes the completion of the switching from the locked state to the unlocked state and stops the forward rotation of the motor 10 when a signal (high level signal) indicating the unlocked state is received from the unlocked state sensor switch 50.

During the locking operation control for switching from the unlocked state to the locked state, the microcomputer 60 provides the transistor TR2 with a signal having a high level and continues to provide the transistor TR1 with a signal having a low level. Therefore, the transistor TR2 is activated, and the transistor TR1 remains inactivated. The coil 81 of the relay 80 is energized, and the coil 71 of the relay 70 remains de-energized. As a result, during the locking operation control, current flows from the positive terminal of the vehicle battery to the negative terminal of the vehicle battery through the resistor R1, the positive fixed contact 84 and movable contact 82 of the relay 80, the motor 10, and the movable contact 72 and negative fixed contact 73 of the relay 70.

A locking operation current flow path is formed between the positive terminal of the vehicle battery and the negative terminal of the vehicle battery through the resistor R1, the positive fixed contact 84 and movable contact 82 of the relay 80, the motor 10, and the movable contact 72 and negative fixed contact 73 of the relay 70. In the preferred embodiment, the combined resistance value of the locking operation current flow path is greater than the combined resistance value of the unlocking operation current flow path by an amount corresponding to the resistance value of the resistor R1.

In this way, during the locking operation control, the microcomputer 60 drives the motor 10 to rotate in the reverse direction by activating only the transistor TR2 in the unlocked state.

Then, the microcomputer 60 detects the current flowing to the motor 10 based on the resistance value of the resistor R1 and the voltages at both terminals of the resistor R1. That is, the resistor R1 functions as a shunt resistor. In the locking operation control, when the detected current becomes greater than the current of the unlocked state, the microcomputer 60 provides the transistor TR2 with a signal having a low level signal and continuously provides the transistor TR1 with a signal having a low level. Thus, the transistor TR2 is inactivated, and the transistor TR1 is maintained inactivated. Therefore, the coil 81 of the relay 80 is de-energized, and the coil 71 of the relay 70 remains de-energized. As a result, current does not flow to the motor 10. This stops the reverse rotation of the motor 10.

In this way, when the locking bar 30 engages the steering shaft 20 during the locking operation control, the current flowing to the motor 10 increases. The microcomputer 60 recognizes that the switching from the unlocked state to the locked state has been completed based on the increase in the current and thus stops the reverse rotation of the motor 10. Specifically, the steering shaft locking device 1 includes a stopper 90, which is contacted when the locking bar 30 reaches the lock position. When the locking bar 30 contacts the stopper 90, the current flowing to the motor 10 increases.

The steering shaft locking device 1 of the preferred embodiment has the advantages described below.

(1) The unlock operation current flow path does not include the resistor R1, and the lock operation current flow path includes the resistor R1. When current flows in the lock operation current flow path during the lock operation control, the resistor R1 causes a voltage drop by an amount obtained by multiplying the current by the resistance value of the resistor R1. Thus, the voltage applied to the motor 10 during the lock operation control is smaller than that during the unlock operation control. That is, the resistor R1 functions as a means for applying the optimum voltage to the motor 10 (voltage optimizing means). The resistor R1 reduces the voltage applied to the motor 10 during the lock operation control so as to be less than that during the unlock operation control. Therefore, the application of a voltage that is higher than necessary to the motor 10 is avoided in the lock operation control. Accordingly, the steering shaft locking device 1 performs the locking operation in an optimal manner.

(2) The lock operation current flow path includes the resistor R1. The combined resistance value of the lock operation current flow path is greater than the combined resistance value of the unlock operation current flow path by an amount corresponding to the resistance of the resistor R1. Thus, the current flowing to the motor 10 during the lock operation control is less than the current flowing to the motor 10 during the unlock operation control. Therefore, the rotation drive force of the motor 10 does not become greater than necessary during the lock operation control. As a result, the steering shaft locking device 1 performs the locking operation in an optimal manner.

(3) The following advantages are obtained when optimizing the voltage (current flowing to the motor 10) applied to the motor 10 during the lock operation control as described in advantages (1) and (2). The reduced voltage applied to the motor 10 (current flowing to the motor 10) extends the life of the motor 10. In addition, the impact noise produced when the locking bar 30 engages the steering shaft 20 is smaller.

(4) The resistor R1 functions as a shunt resistor so that the microcomputer 60 detects the current flowing to the motor 10 based on the resistance value of the resistor R1 and the voltages at both terminals of the resistor R1. When the locking bar 30 engages the steering shaft 20 in the lock operation control, the current flowing to the motor 10 increases. The microcomputer 60 recognizes the completion of the switching to the locked state based on the increase in the current. Therefore, the steering shaft locking device 1 differs from the conventional steering shaft locking device 100 inasmuch as a locked state sensor switch similar to the locked state sensor switch 160 is not required. Accordingly, the manufacturing cost of the steering shaft locking device 1 is reduced.

It should be apparent to those skilled in the art that the present invention may be embodied in many other specific forms without departing from the spirit or scope of the invention. Particularly, it should be understood that the present invention may be embodied in the following forms.

In the preferred embodiment, the resistor R1 is connected between the positive fixed contact 74 and the positive fixed contact 84. In addition to this structure or in lieu of this structure, a resistor similar to the resistor R1 may be connected between the negative fixed contact 73 and the negative fixed contact 83. In this case, the combined resistance value of the lock operation current flow path is greater than the combined resistance value of the unlock operation current flow path similar to the preferred embodiment.

In the preferred embodiment, the resistor R1 is included only in the lock operation current flow path. Alternatively, the lock operation current flow path may include the resistor R1, and the unlock operation current flow path may include a resistor R2 (refer to FIG. 3), which has a smaller resistance value than the resistor R1. In this case, the combined resistance value of the lock operation current flow path is greater than the combined resistance value of the unlock operation current flow path in the same manner as the preferred embodiment.

When the unlock operation current flow path includes the resistor R2, the resistor R2 may also function as a shunt resistor. That is, while the resistor R1 of the lock operation current flow path functions as a shunt resistor, the resistor R2 of the unlock operation current flow path may also function as a shunt resistor. The steering shaft locking device 1 may also include a stopper 91. In this case, the locking bar 30 contacts the stopper 91 when the locking bar 30 is disengaged from the steering shaft 20.

In this structure, the microcomputer 60 detects the current flowing to the motor 10 during the unlock operation control based on principles similar to the preferred embodiment. Since a relatively large force is required to pull the locking bar 30 from the concavity 21 of the steering shaft 20, a relatively large current flows to the motor 10 until the locking bar 30 is disengaged from the steering shaft 20 during the unlock operation control. Then, the current flowing to the motor 10 is relatively small until the locking bar 30 contacts the stopper 91. When the locking bar 30 contacts the stopper 91, the current flowing to the motor 10 becomes large. Accordingly, when the microcomputer 60 detects an increase in current after detecting a decrease in current in the locked state, the microcomputer 60 recognizes the completion of the switching front the locked state to the unlocked state and thus stops the forward rotation of the motor 10. Therefore, in this structure, the manufacturing cost of the steering shaft locking device 1 is further reduced compared to the preferred embodiment since the unlocked state sensor switch 50 is unnecessary.

For the combined resistance value of the lock operation current flow path to be greater than the combined resistance value of the unlock operation current flow path, the lead wire used in the lock operation current flow path, for example, may be narrower than the lead wires used in the unlock operation current flow path. Alternatively, the former lead wires may be longer than the latter lead wires.

In a structure in which a motor is PWM controlled by a so-called H bridge including four FETs, a microcomputer may perform PWM control so that the voltage applied to the motor during lock operation control is less than the voltage applied to the motor during the unlock operation control (first construction).

In a structure for controlling the voltage (current) of a motor with a power supply ECU, the power supply ECU may control the voltage (current) so that the voltage (supplied current) applied to the motor during the lock operation control is less than the voltage applied to the motor during the unlock operation control (second construction).

A microcomputer may monitor the voltage of a vehicle battery and initiate the lock operation control when the voltage of the vehicle battery falls below a predetermined threshold value (for example, the same voltage level as when starting the unlock operation control) (third construction).

The structures of the preferred embodiment, the first construction, the second construction, and the third construction may be employed independently or in combinations of two or more.

The present examples and embodiments are to be considered as illustrative and not restrictive, and the invention is not to be limited to the details given herein, but may be modified within the scope and equivalence of the appended claims.

What is claimed is:

1. A steering shaft locking device for selectively locking a steering shaft of a vehicle, the steering shaft locking device comprising:
    an actuator for generating a drive force when voltage is applied to the actuator;
    a locking means moved by the drive force of the actuator and engageable with the steering shaft;
    a control unit, connected to the actuator, for performing a first control that moves the locking means to a lock position, at which the locking means engages the steering shaft, and a second control that moves the locking means to an unlock position, at which the locking means is disengaged from the steering shaft; and
    a voltage control means for controlling the voltage applied to the actuator during the first control to be less than the voltage applied to the actuator during the second control.

2. The steering shaft locking device of claim 1 further comprising:
    a first current flow path for supplying current to the actuator during the first control; and
    a second current flow path for supplying current to the actuator during the second control,
    wherein the voltage control means is provided in at least either one of the first current flow path and the second current flow path so that the first current flow path has a resistance value that is greater than that of the second current flow path.

3. The steering shaft locking device of claim 2, wherein the voltage control means includes a first wiring arranged in the first current flow path and a second wiring arranged in the second current flow path, and the first wiring and second wiring are designed such that the resistance value of the first current flow path is greater than the resistance value of the second current flow path.

4. The steering shaft locking device of claim 2, wherein the voltage control means includes a first resistor arranged in the first current flow path, and a second resistor, having a resistance value that is less than that of the first resistor, arranged in the second current flow path.

5. The steering shaft locking device of claim 2, wherein the voltage control means includes a first resistor, having a resistance value that is greater than the resistance value of the second current flow path, arranged in the first current flow path.

6. The steering shaft locking device of claim 5, wherein the control unit is connected to the first resistor and detects the current flowing to the actuator based on the voltage applied to the first resistor and the resistance value of the first resistor, the control unit stopping the actuator when the currently detected current becomes greater than the current detected when the locking means is moved to the lock position during the first control.

7. The steering shaft locking device of claim 6, further comprising:
   a stopper for contacting the locking means when the locking means is disengaged from the steering shaft;
   a second resistor connected to the control unit and included in the second current flow path, the control unit detecting the current flowing to the actuator based on the resistance value of the second resistor and the voltage applied to the second resistor, wherein the control unit stops the actuator when the currently detected current is greater than the current detected when the locking means is moved to the unlock position during the second control.

8. A steering shaft locking device for selectively locking the steering shaft of a vehicle, the steering shaft locking device comprising:
   an actuator for generating a drive force when voltage is applied to the actuator;
   a locking means moved by the drive force of the actuator and engageable with the steering shaft;
   a control unit, connected to the actuator, for applying a first voltage to the actuator to move the locking means to a lock position, at which the locking means engages the steering shaft and applying a second voltage to the actuator to move the locking means to an unlock position, at which the locking means is disengaged from the steering shaft, wherein the first voltage is less than the second voltage.

9. The steering shaft locking device of claim 8, wherein:
   the vehicle includes a power supply having a positive terminal and a negative terminal;
   the actuator includes a first terminal and a second terminal; and
   the control unit includes:
   a first relay, connected between the positive terminal and the negative terminal, for connecting the first terminal of the actuator to one of the positive terminal and negative terminal of the power supply;
   a second relay, connected between the first relay and the negative terminal, for connecting the second terminal of the actuator to the other one of the positive terminal and negative terminal of the power supply; and
   a resistor connected between the first relay and the second relay.

10. The steering shaft locking device of claim 9, further comprising:
    a stopper for contacting the locking means when the locking means reaches the lock position, wherein the control unit includes a computer connected to the first relay, the second relay, and the resistor, the computer detecting the current flowing to the actuator based on the voltage applied to the resistor and the resistance value of the resistor, and the computer stopping the actuator when the currently detected current becomes greater than the current detected when the locking means is moved to the lock position.

11. The steering shaft locking device of claim 8, wherein:
    the vehicle includes a power supply having a positive terminal and a negative terminal;
    the actuator includes a first terminal and a second terminal; and
    the control unit includes:
    a first relay having a first positive contact connected to the positive terminal and a first negative contact connected to the negative terminal, the first relay connecting the first terminal of the actuator to one of the first positive contact and the first negative contact;
    a second relay having a second positive contact connected to the positive terminal and a second negative contact connected to the negative terminal, the second relay connecting the second terminal of the actuator to one of the second positive contact and the second negative contact, the first positive terminal connected between the second positive contact and the positive terminal, and the second negative contact connected between the first negative contact and the negative terminal; and
    a resistor connected between the first positive contact and second positive contact or between the first negative contact and second negative contact.

12. A steering shaft locking device for selectively locking the steering shaft of a vehicle, the steering shaft locking device comprising:
    an actuator for generating a drive force when supplied with current;
    a locking means moved by the drive force of the actuator and engageable with the steering shaft;
    a first current flow path for supplying current to the actuator to move the locking means to a lock position at which the locking means engages the steering shaft; and
    a second current flow path for supplying current to the actuator to move the locking means to an unlock position at which the locking means is disengaged from the steering shaft, the first current flow path having a resistance value that is greater than that of the second current flow path.

* * * * *

UNITED STATES PATENT AND TRADEMARK OFFICE
CERTIFICATE OF CORRECTION

PATENT NO. : 7,098,554 B2  Page 1 of 1
APPLICATION NO. : 10/902338
DATED : August 29, 2006
INVENTOR(S) : Masaki Hayashi et al.

It is certified that error appears in the above-identified patent and that said Letters Patent is hereby corrected as shown below:

Column 7
Line 58, delete "front" and insert therefore -- from --.

Signed and Sealed this

Twelfth Day of December, 2006

JON W. DUDAS
*Director of the United States Patent and Trademark Office*